July 13, 1937.   J. R. AKERS   2,086,525
COMPOSITE ARTICLE
Filed May 13, 1933
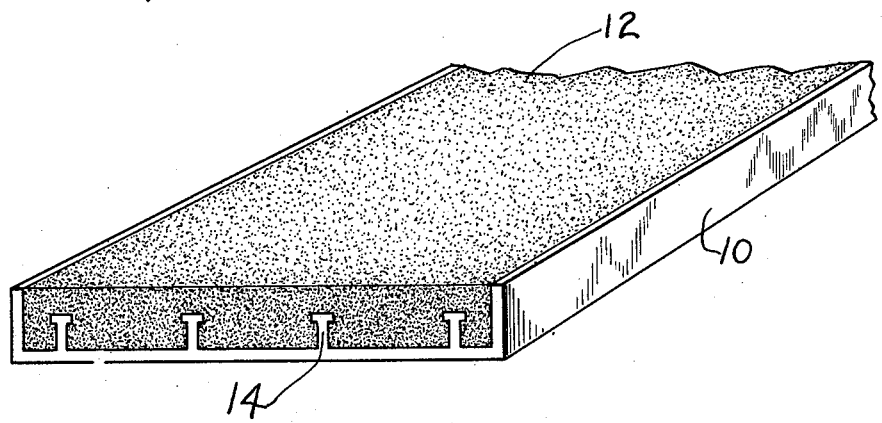
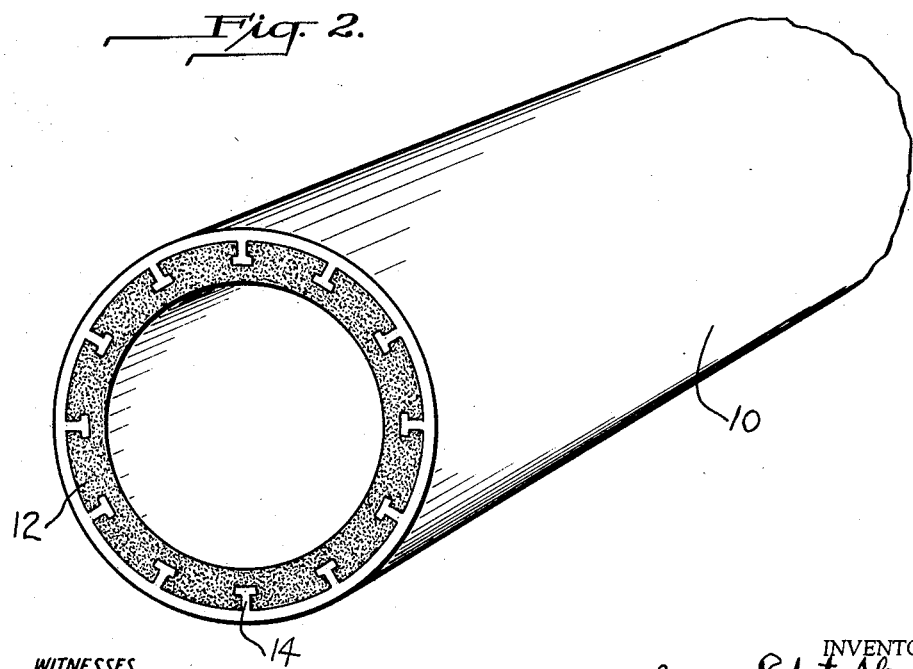
INVENTOR.
James Robert Akers
BY L. E. Webster
ATTORNEY.

Patented July 13, 1937

2,086,525

UNITED STATES PATENT OFFICE 2,086,525

COMPOSITE ARTICLE

James Robert Akers, New Kensington, Pa., assignor to Aluminum Company of America, Pittsburgh, Pa., a corporation of Pennsylvania Application May 13, 1933, Serial No. 670,999

2 Claims. (Cl. 72—0.5)

This invention relates to the production of an improved plastic cement composition, particularly, an improved magnesia cement composition of the type known as Sorel cement, for use in connection with aluminum surfaces.

The term "Sorel cement" is generally applied to a class of magnesia cements which derive their structural properties from a compound of magnesium oxide and magnesium chloride. This type of cement sets quickly and produces a smooth, even surface. It may be laid in large areas without cracking and it quickly attains a high strength. It is hard and its surface may be highly polished. These properties recommend it particularly for use in the interior finishing of structures, and it finds frequent application in the construction of sanitary floors.

Sorel cements are made usually by treating a dry mixture containing finely ground, calcined magnesite or dolomite, or other form of plastic magnesia and an inert filling material such as silica clay, asbestos, or sand, with a gaging solution containing magnesium chloride. In the setting of the cement a compound is formed between the magnesia, the magnesium chloride and water generally designated as a magnesium oxychloride compound. Such Sorel cements are therefore sometimes designated as oxychloride cements.

These Sorel cements are more or less corrosive when used in contact with metal surfaces, such as the surfaces of metallic structural members. They are particularly corrosive to aluminum surfaces and this property has limited their application as finishing cements in structures in which aluminum and aluminum alloy structural materials are used.

It is the principal object of this invention to produce a plastic magnesia cement composition of the Sorel cement type which will not corrode aluminum and aluminum alloy surfaces when used in contact with them.

My invention is predicated upon the discovery that a soluble chromate or dichromate compound, which are referred to hereinafter by the generic term "dichromate", will inhibit the corrosive action of a magnesium oxychloride cement on an aluminum surface, and that such a compound may be incorporated in a Sorel cement composition in amounts sufficient to completely prevent attack of an aluminum or aluminum alloy surface by such cement, without modifying the same desirable physical properties of the cement itself, such as its setting properties, its strength, or its hardness. Thus I have been able to produce a cement composition which retains all the valuable properties of the Sorel cements and in addition thereto does not have the objectionable corrosive action of such cements when used in contact with an aluminum surface.

In producing the cement composition according to my invention I add to the usual components of a Sorel cement a soluble chromate or dichromate salt, preferably an alkali dichromate such as sodium or potassium dichromate. With the addition of a dichromate in an amount as small as 0.5 per cent by weight of the combined dry material and gaging liquid used in forming the cement I have been able to substantially reduce the corrosive action of these cements. However, in order to effect a complete prevention of the corrosive action of such cements upon aluminum, I have found that it is usually necessary that at least 1 per cent by weight of an alkali dichromate be incorporated in the cement composition, and amounts up to 5 per cent of dichromate may be used without adversely affecting the physical properties of the cement. When a chromate salt such as an alkali chromate is used, it should be in an amount equivalent in chromate content to the above recited percentages of dichromate. While these salts may be used in amounts of 0.5 to 5 per cent, I prefer to use not more than 1 to 2 per cent of the salts, since amounts in this range are generally effective in producing a complete inhibiting of the corrosive properties of the cement.

The corrosion-inhibiting dichromate may be incorporated in the cement composition by mixing it with the dry ingredients of the cement, that is, the magnesium oxide and the filler materials, or it may be dissolved in the gaging liquid with the magnesium chloride. In general, however, I prefer to mix the corrosion-inhibiting salt with the dry solid materials.

As a specific example of the beneficial effect of the addition of an alkali dichromate to a magnesium oxychloride cement composition is the following comparative test. Three specimens of aluminum were coated respectively with (1) a Sorel cement formed by treating a dry mix containing about 37 per cent of magnesium oxide with a 20 per cent magnesium chloride solution in proportions of 15 pounds of the former to one gallon of the latter; (2) the Sorel cement above described to which 0.5 per cent by weight of potassium dichromate had been added; (3) the same Sorel cement above described to which 1.0 per cent by weight of potassium dichromate had been added. After three weeks' exposure under room conditions the cement coatings were removed and the aluminum samples were examined for corrosion. The sample coated with plain Sorel cement showed extensive and severe corrosion. The sample coated with Sorel cement to which 0.5 per cent dichromate had been added showed less extensive and less severe corrosion. The sample coated with the Sorel cement to which 1 per cent dichromate had been added showed no corrosion.

In the accompanying drawing, Figs. 1 and 2 are perspective views of aluminum structural members having portions of their surfaces coated with a magnesium oxychloride cement containing a small amount of a soluble dichromate in accordance with my invention. In each figure, 10 indicates an aluminum or aluminum alloy member which is partially covered and in close contact with a coating 12 of magnesium oxychloride cement. This cement is made non-corrosive to the aluminum by the inclusion therein of a small amount, such as 0.5 per cent to 5 per cent, of a soluble chromate or dichromate, preferably an alkali dichromate, as previously stated. The aluminum member 10 may be of any required shape, and may be provided with ribs 14 or other means adapted to assist in holding the cement in contact with its surface, if desired, although such means are unnecessary in many cases.

Having now particularly described and pointed out the essential features of my invention, what I claim is:

1. A composite article comprising an aluminum member intimately associated and in surface contact with a magnesium oxychloride cement body containing 0.5 to 5.0 per cent of a soluble dichromate, said cement body being substantially non-corrosive to the aluminum surface in contact therewith.

2. A composite article comprising an aluminum member intimately associated and in surface contact with a magnesium oxychloride cement body containing 1 to 2 per cent of a soluble dichromate, said cement body being substantially non-corrosive to the aluminum surface in contact therewith.

JAMES ROBERT AKERS.